US006965101B2

(12) United States Patent
Kim et al.

(10) Patent No.: US 6,965,101 B2

(45) Date of Patent: Nov. 15, 2005

(54) COOLING STRUCTURE FOR OVEN DOOR OF MICROWAVE OVEN USABLE AS PIZZA OVEN

(75) Inventors: Seung Hoc Kim, Gyunggi-do (KR); Kyung Hoi Yang, Bucheon-si (KR)

(73) Assignee: Daewoo Electronics Corporation, Seoul (KR)

(*) Notice: Subject to any disclaimer, the term of this patent is extended or adjusted under 35 U.S.C. 154(b) by 0 days.

(21) Appl. No.: 11/013,661

(22) Filed: Dec. 16, 2004

(65) Prior Publication Data

US 2005/0133503 A1 Jun. 23, 2005

(30) Foreign Application Priority Data

Dec. 18, 2003 (KR) ...................... 10-2003-0093007

(51) Int. Cl.[7] .................................................. G05B 6/80

(52) U.S. Cl. ...................... 219/757; 219/680; 219/685; 219/756; 219/739; 126/21 A

(58) Field of Search ................................ 219/756–757, 219/680–685, 739; 126/21 A, 21 R

(56) References Cited

U.S. PATENT DOCUMENTS

| | | | | |
|---|---|---|---|---|
| 3,711,673 A * | 1/1973 | Takeda et al. | .............. | 219/757 |
| 5,928,540 A * | 7/1999 | Antoine et al. | ............. | 219/757 |
| 6,344,637 B2 | 2/2002 | Lee et al. | | |
| 2002/0084266 A1 | 7/2002 | Ahn | | |
| 2004/0144774 A1* | 7/2004 | Kim | ............................ | 219/680 |

FOREIGN PATENT DOCUMENTS

| | | | | |
|---|---|---|---|---|
| JP | 61-153413 | * 7/1986 | ................. | 219/757 |

* cited by examiner

*Primary Examiner*—Philip H. Leung
(74) *Attorney, Agent, or Firm*—Workman-Nydegger

(57) ABSTRACT

A cooling structure for an oven door of a microwave oven usable as a pizza oven, which includes air inlet perforations formed through a portion of a chamber partition wall contacting one side section of the oven door to communicate with an electric device installation chamber, and thus, to receive ambient air, air inlet perforations formed through the side section of the oven door, the inlet perforations having the same shape as the first air inlet perforations such that the second air inlet perforations are aligned with the first air inlet perforations to introduce the air into the interior of the oven door, and air outlet perforations formed through the other side and top sections of the oven door to outwardly exhaust the air introduced into the interior of the oven door.

1 Claim, 4 Drawing Sheets

COOLING STRUCTURE FOR OVEN DOOR OF MICROWAVE OVEN USABLE AS PIZZA OVEN

CROSS-REFERENCE TO RELATED APPLICATIONS

This application claims priority to Korean Application No. 2003-93007, filed Dec. 18, 2003, which application is incorporated herein by specific reference.

BACKGROUND OF THE INVENTION

1. The Field of the Invention

The present invention relates to a cooling structure for an oven door of a microwave oven usable as a pizza oven, and, more particularly, a cooling structure for an oven door of a microwave oven usable as a pizza oven, which includes first air inlet perforations formed through a portion of the partition wall contacting one side section of the oven door, second air inlet perforations formed through the side section of the oven door, and air outlet perforations formed through the other side and top sections of the oven door, so that the cooling structure can rapidly cool the oven door by ambient air supplied through a cooling fan, and thus, can prevent the user from burning his hands when opening the oven door.

2. The Relevant Technology

A microwave oven usable as a pizza oven is well known. Such a microwave oven is a complex appliance capable of cooking both the general food and the pizza. Referring to FIG. 4, a conventional microwave oven usable as a pizza oven is illustrated. As shown in FIG. 4, the conventional microwave oven, which is designated by reference numeral 100, includes an oven body defined with a cooking chamber 102 to cook food and an electric device installation chamber 104 partitioned by a partition wall 101. A cooling fan 105 is installed in the electric device installation chamber 104. A pizza cooking chamber 106 is defined in a desired portion of the cooking chamber 102, for example, an upper portion of the cooking chamber 102 as in the illustrated case. Air inlet holes 107 are formed through a portion of the partition wall 101 facing the pizza cooking chamber 106. Air outlet holes 108 are formed through an upper wall of the oven body defining the top of the pizza cooking chamber 106. Upper and lower heaters 112 and 114 are fixedly mounted to the top and bottom of the pizza cooking chamber 106 in the interior of the pizza cooking chamber 106, respectively. An oven door 110 is mounted to the oven body at the front side of the pizza cooking chamber 106 to open/close the pizza cooking chamber 106. A pizza pan 120, on which a pizza to be cooked will be laid, is positioned on the lower heater 114. The upper and lower heaters 112 and 114 are electrically connected to a control panel 109 mounted to a front wall of the oven body so that the upper and lower heaters 112 and 114 can be controlled in accordance with operation of the control panel 109.

When it is desired to cook a pizza in the microwave oven 100 having the above-mentioned configuration to be also usable as a pizza oven, the user operates the operating panel 109 to operate the upper and lower heaters 112 and 114 mounted in the pizza cooking chamber 106, and thus, to heat the pizza cooking chamber 106 to a temperature optimal for the cooking of the pizza. Thereafter, the user opens the oven door 110, lays the pizza on the pizza pan 120 positioned on the lower heater 114, and closes the oven door 110. Thus, the cooking of the pizza is carried out.

After completion of the pizza cooking operation, it is necessary to cool the pizza cooking chamber 106 heated during the pizza cooking operation. This cooling operation is carried out as follows. That is, when the user operates the operating panel 109 to cool the pizza cooking chamber 106, the cooling fan 105 is operated, thereby causing ambient air to be sucked into the interior of the electric device installation chamber 104 through the cooking fan 105. The air sucked into the electric device installation chamber 104 is then introduced into the pizza cooking chamber 106 through the air inlet holes 107, and then is exhausted through the air outlet holes 108 while cooling the heated interior of the pizza cooking chamber 106. As this cooling procedure is repeatedly carried out, the pizza cooking chamber 106 is cooled.

However, although the pizza cooking chamber heated during the pizza cooking operation is cooled by the ambient air in accordance with the above-mentioned cooling procedure, the oven door heated by heat transferred thereto from the upper and lower heaters is ineffectively cooled. For this reason, the conventional microwave oven has a problem in that the user may burn his hands when touching the oven door or opening the oven door.

SUMMARY OF THE INVENTION

The present invention has been made in view of the above-mentioned problems, and it is an object of the invention to provide a cooling structure for an oven door of a microwave oven usable as a pizza oven, which can rapidly cool the oven door by ambient air supplied through a cooling fan, and thus, can prevent the user from burning his hands when opening the oven door.

In accordance with the present invention, this object is accomplished by providing a cooling structure for an oven door of a microwave oven usable as a pizza oven, the microwave oven including an oven body defined with a cooking chamber and an electric device installation chamber partitioned by a vertical partition wall, a cooling fan installed in the electric device installation chamber, a pizza cooking chamber defined in the cooking chamber at one side of the cooking chamber, upper and lower heaters fixedly mounted to the top and bottom of the pizza cooking chamber in the interior of the pizza cooking chamber, respectively, and the oven door mounted to the oven body at the front side of the pizza cooking chamber to open/close the pizza cooking chamber, the cooling structure comprising: a plurality of first air inlet perforations formed through a portion of the partition wall contacting one side section of the oven door in a closed state of the pizza cooking chamber, the first air inlet perforations receiving ambient air supplied from the cooling fan; a plurality of second air inlet perforations formed through the side section of the oven door, the second air inlet perforations having the same shape as the first air inlet perforations such that the second air inlet perforations are aligned with the first air inlet perforations in the closed state of the pizza cooking chamber; and a plurality of uniformly-spaced air outlet perforations formed through the other side and top sections of the oven door to outwardly exhaust the air introduced into the interior of the oven door.

In accordance with the cooling structure of the present invention, ambient air supplied into the electric device installation chamber during an operation of the cooling fan is introduced into the interior of the oven door through the first air inlet perforations of the partition wall and the second air inlet perforations of the oven door, and is exhausted through the air outlet perforations of the oven door after cooling the oven door heated by the heat from the upper and lower heaters.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
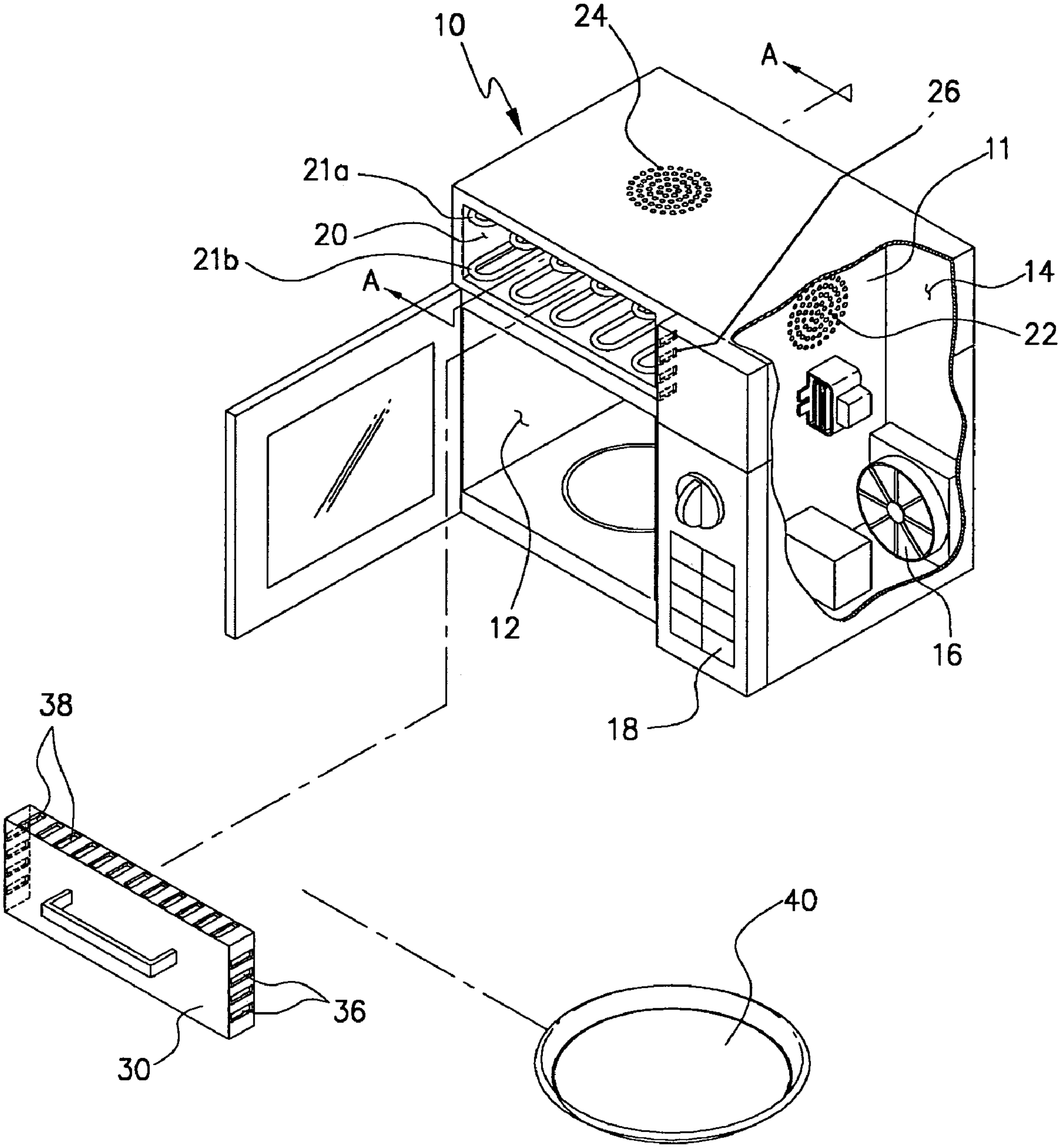
FIG. 1 is a partially-broken perspective view illustrating a microwave oven usable as a pizza oven in accordance with an exemplary embodiment of the present invention.
Figure 2:
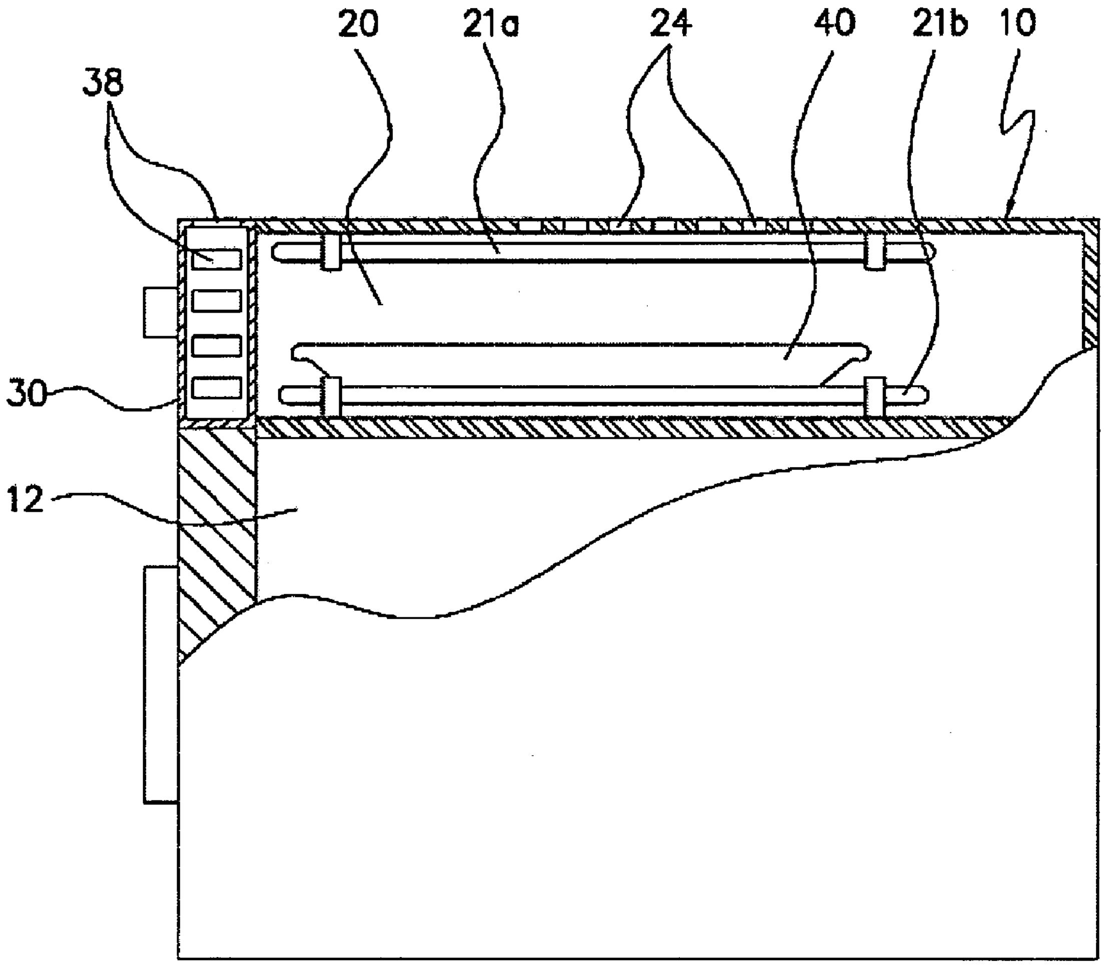
FIG. 2 is a cross-sectional view taken along the line A—A of FIG. 1.

FIG. 1 illustrates a microwave oven usable as a pizza oven in accordance with an exemplary embodiment of the present invention. FIG. 2 is a cross-sectional view taken along the line A—A of FIG. 1.

As shown in FIGS. 1 and 2, the microwave oven according to the first embodiment of the present invention, which is designated by reference numeral 10, includes an oven body defined with a cooking chamber 12 to cook food and an electric device installation chamber 14 partitioned by a partition wall 11. A cooling fan 16 is installed in the electric device installation chamber 14. A pizza cooking chamber 20 is defined in a desired portion of the cooking chamber 12, for example, an upper portion of the cooking chamber 12 as in the illustrated case. Air inlet holes 22 are formed through a portion of the partition wall 11 facing the pizza cooking chamber 20. Air outlet holes 24 are formed through an upper wall of the oven body defining the top of the pizza cooking chamber 20. Upper and lower heaters 21*a* and 21*b* are fixedly mounted to the top and bottom of the pizza cooking chamber 20 in the interior of the pizza cooking chamber 20, respectively. An oven door 30 is mounted to the oven body at the front side of the pizza cooking chamber 20 to open/close the pizza cooking chamber 20. Although not shown, the oven door 30 may be slidably mounted to the oven body to open/close the pizza cooking chamber 106. A pizza pan 40, on which a pizza to be cooked will be laid, is positioned on the lower heater 21*b*. Alternatively, the pizza pan 40 may be provided at an inner surface of the oven door 30 such that the pizza pan 40 is integral with the oven door 30. The upper and lower heaters 21*a* and 21*b* are electrically connected to a control panel 18 mounted to a front wall of the oven body so that the upper and lower heaters 21*a* and 21*b* can be controlled in accordance with operation of the control panel 18.

Although the pizza cooking chamber 20 is defined in the upper portion of the cooking chamber 12 in the illustrated case, the pizza cooking chamber 20 may be formed at the lower, left or right portion of the cooking chamber 12, if desired.

As shown in FIG. 1, a plurality of uniformly-spaced first air inlet perforations 26 are formed through a portion of the partition wall 11 contacting one side section of the oven door 30 in a state in which the oven door 30 is mounted in position in the oven body, that is, in a closed state of the pizza cooking chamber 20. The first air inlet perforations 26 communicate with the electric device installation chamber 14 to receive ambient air from the electric device installation chamber 14. A plurality of second air inlet perforations 36 having the same shape as the first air inlet perforations 26 are formed through the side section of the oven door 30. In the closed state of the pizza cooking chamber 20, the second air inlet perforations 36 are aligned with the first air inlet perforations 26 to communicate with the first air inlet perforations 26. In this state, the second air inlet perforations 36 can introduce, into the interior of the oven door 30, the air passing through the first air inlet perforations 26. A plurality of uniformly-spaced air outlet perforations 38 are also formed through the top section of the oven door 30 and the other side section of the oven door 30 opposite to the second air inlet perforations 36 to outwardly exhaust the air introduced into the interior of the oven door 30.

Figure 3:
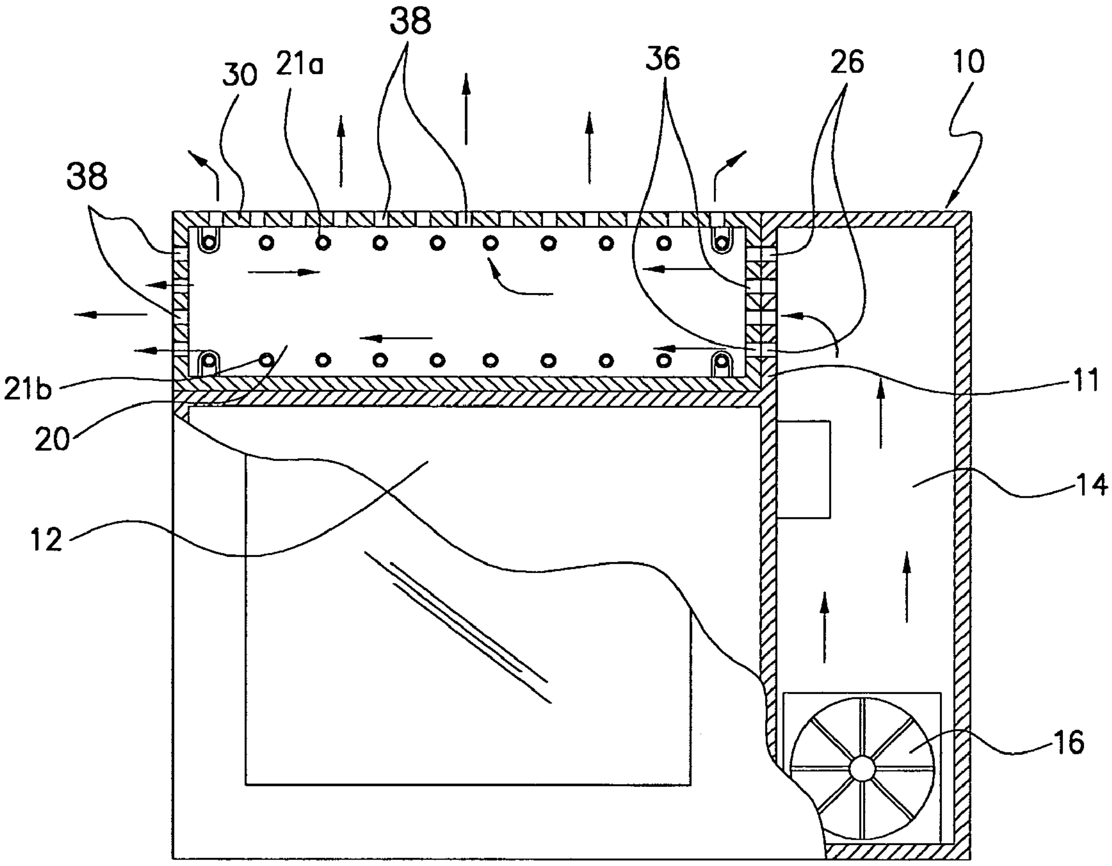
FIG. 3 is a partially-sectional view illustrating a procedure for cooling an oven door by ambient air introduced into the microwave oven of FIG. 1.
Figure 4:
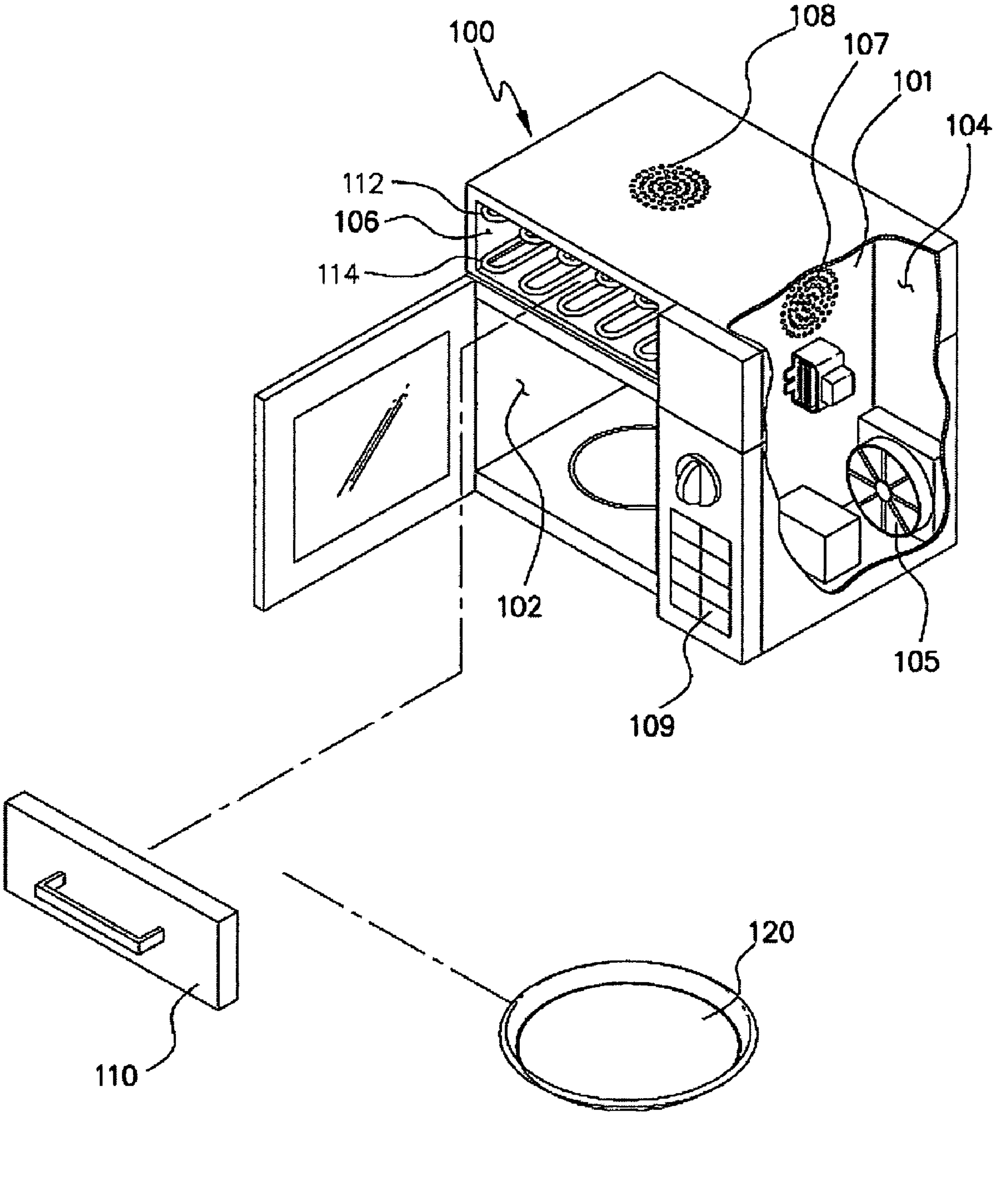
FIG. 4 (PRIOR ART)
FIG. 4 is a partially-broken exploded perspective view illustrating a conventional microwave oven usable as a pizza oven.

Referring to FIG. 3, a procedure, in which the oven door 30 is cooled by ambient air introduced into the microwave oven of FIG. 1, is illustrated.

Hereinafter, the cooling operation of the oven door cooling structure having the above described configuration according to the illustrated embodiment of the present invention will be described with reference to FIG. 3.

When the user operates the operating panel 18 to operate the upper and lower heaters 21*a* and 21*b* mounted in the pizza cooking chamber 20, electric power is supplied to the upper and lower heaters 21*a* and 21*b*, so that heat is generated from the upper and lower heaters 21*a* and 21*b*, thereby heating the pizza cooking chamber 20. During this heating operation, the oven door 30 is also heated by the heat from the upper and lower heaters 21*a* and 21*b*. After completion of the pizza cooking operation, an operation to cool the pizza cooking chamber 20 is carried out. When the user operates the control panel 18 to perform the cooling operation, the cooling fan 16 is first operated, so that a large amount of ambient air is sucked into the interior of the electric device installation chamber 14 through the cooking fan 16.

At this time, a part of the air introduced into the electric device installation chamber 14 is introduced into the pizza cooking chamber 20 through the air inlet holes 22 formed through the portion of the partition wall 11 facing the pizza cooking chamber 20, and is exhausted through the air outlet holes 24 while cooling the heated interior of the pizza cooking chamber 20.

On the other hand, the remaining part of the air introduced into the electric device installation chamber 14 passes through the first air inlet perforations 26 formed through the partition wall 11.

The air passing through the first air inlet perforations 26 is then introduced into the interior of the oven door 30 through the air second inlet perforations 36 of the oven door 30 aligned with the first air inlet perforations 26, and is exhausted through the air outlet perforations 38 of the oven door 30 after cooling the heated oven door 30.

As the above-described cooling procedures are repeatedly carried out, the pizza cooking chamber 20 and oven door 30 heated during the pizza cooking operation are cooled.

As apparent from the above description, the present invention provides a cooling structure for an oven door of a microwave oven usable as a pizza oven, which includes first air inlet perforations formed through a portion of the partition wall contacting one side section of the oven door, second air inlet perforations formed through the side section of the oven door, and air outlet perforations formed through the other side and top sections of the oven door, so that the cooling structure can rapidly cool the oven door by ambient air supplied through a cooling fan, and thus, can prevent the user from burning his hands when opening the oven door.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling structure for an oven door of a microwave oven usable as a pizza oven, the microwave oven including an oven body defined with a cooking chamber and an electric device installation chamber partitioned by partition wall, a cooling fan installed in the electric device installation chamber, a pizza cooking chamber defined in the cooking chamber at one side of the cooking chamber, heaters mounted in the interior of the pizza cooking chamber, respectively, and the oven door mounted to the oven body at the front side of the pizza cooking chamber to open/close the pizza cooking chamber, the cooling structure comprising:

a plurality of first air inlet perforations formed through a portion of the partition wall contacting one side section of the oven door in a closed state of the pizza cooking chamber;

a plurality of second air inlet perforations formed through the side section of the oven door, the second air inlet perforations having the same shape as the first air inlet perforations such that the second air inlet perforations are aligned with the first air inlet perforations in the closed state of the pizza cooking chamber; and a plurality of uniformly-spaced air outlet perforations formed through the other side and top sections of the oven door to outwardly exhaust the air introduced into the interior of the oven door.

* * * * *